United States Patent
Kawaguchi et al.

(10) Patent No.: US 7,327,729 B2
(45) Date of Patent: Feb. 5, 2008

(54) SYSTEM AND METHOD FOR COMMUNICATIONS WITH RESERVATION OF NETWORK RESOURCES, AND TERMINAL THEREFORE

(75) Inventors: Yuichi Kawaguchi, Kasuya-Gun (JP); Satoshi Ando, Munakata-Gun (JP); Masao Oomoto, Kasuya-Gun (JP); Yuji Shimizu, Koga (JP); Masato Ohura, Iizuka (JP)

(73) Assignee: Matushita Electric Industrial Co., Ltd., Osaka (JP)

( * ) Notice: Subject to any disclaimer, the term of this patent is extended or adjusted under 35 U.S.C. 154(b) by 802 days.

(21) Appl. No.: 10/759,092

(22) Filed: Jan. 20, 2004

(65) Prior Publication Data
US 2004/0156364 A1    Aug. 12, 2004

(30) Foreign Application Priority Data
Jan. 21, 2003   (JP)   ............................. 2003-012035

(51) Int. Cl.
  *H04L 12/28*   (2006.01)
(52) U.S. Cl. .................... 370/389; 370/401; 455/435.3
(58) Field of Classification Search ................ 370/389, 370/392, 400, 401, 351, 352, 356, 357, 386, 370/360, 461, 349, 276, 395.42, 908; 455/435.3, 455/435.1, 524; 709/219, 229; 710/40
See application file for complete search history.

(56) References Cited

U.S. PATENT DOCUMENTS

| | | | |
|---|---|---|---|
| 5,970,062 A | 10/1999 | Bauchot | |
| 6,292,489 B1 * | 9/2001 | Fukushima et al. | 370/401 |
| 6,693,875 B1 * | 2/2004 | Matsubara et al. | 370/217 |
| 6,845,100 B1 | 1/2005 | Rinne | |
| 7,123,914 B2 * | 10/2006 | Matsubara et al. | 455/436 |
| 2001/0032262 A1 | 10/2001 | Sundqvist et al. | |
| 2002/0085528 A1 | 7/2002 | Reza et al. | |
| 2002/0161914 A1 | 10/2002 | Belenki | |
| 2003/0002511 A1 | 1/2003 | Ohba et al. | |
| 2005/0185651 A1 | 8/2005 | Rinne | |

FOREIGN PATENT DOCUMENTS

| | | |
|---|---|---|
| EP | 0 804 006 | 10/1997 |
| JP | 2000-209267 | 7/2000 |
| WO | 02/19619 | 3/2002 |

* cited by examiner

*Primary Examiner*—Chi Pham
*Assistant Examiner*—Alexander O. Boakye
(74) *Attorney, Agent, or Firm*—Wenderoth, Lind & Ponack, L.L.P.

(57) ABSTRACT

The communication system supports reservation of network resources. The base stations relay packets among the terminals, and perform priority control based on the priority set to the packets. In the terminal, the communication-managing table stores communication information of own terminal and a partner thereof. The packet-transmitting unit, setting priority to the packets, transmits the packets. When link condition of own terminal change, the link-managing unit updates, in order to prevent from quality deterioration of the other terminals, the priority of each of the packets whose source terminal is the own terminal.

8 Claims, 12 Drawing Sheets

| source | destination | socket number | DSCP priority | DSCP provisional priority | 802.1p priority | 802.1p provisional priority | reservation-missing |
|---|---|---|---|---|---|---|---|
| terminal 40 | terminal 10 | 20 | 0 | 0 | 0 | 0 | OFF |

Fig. 6(b)

| source | destination | socket number | DSCP priority | DSCP provisional priority | 802.1p priority | 802.1p provisional priority | reservation-missing |
|---|---|---|---|---|---|---|---|
| terminal 40 | terminal 10 | 20 | 32 | 0 | 6 | 0 | OFF |

Fig. 6(c)

| source | destination | socket number | DSCP priority | DSCP provisional priority | 802.1p priority | 802.1p provisional priority | reservation-missing |
|---|---|---|---|---|---|---|---|
| terminal 40 | terminal 10 | 20 | 32 | 0 | 6 | 0 | ON |

Fig. 6(d)

| source | destination | socket number | DSCP priority | DSCP provisional priority | 802.1p priority | 802.1p provisional priority | reservation-missing |
|---|---|---|---|---|---|---|---|
| terminal 40 | terminal 10 | | 0 | 0 | 0 | 0 | ON |

Fig. 6(e)

| source | destination | socket number | DSCP priority | DSCP provisional priority | 802.1p priority | 802.1p provisional priority | reservation-missing |
|---|---|---|---|---|---|---|---|
| terminal 40 | terminal 10 | 20 | 16 | 0 | 5 | 0 | OFF |

SYSTEM AND METHOD FOR COMMUNICATIONS WITH RESERVATION OF NETWORK RESOURCES, AND TERMINAL THEREFORE

BACKGROUND OF THE INVENTION

1. Field of the Invention

The present invention relates to a communication system that supports reservation of network resources, and arts related thereto.

2. Description of the Related Art

In communications in network environments such as the Internet, data is decomposed to a plurality of packets, which are transmitted via the network.

In general, the transmission of packets is processed in a "best effort" mode. This means that traffic of AV (Audio/Visual) communications and traffic of other transmissions, for example ftp/http transmissions, are treated equally, although what should be processed in real time is not the traffic of other transmissions but the traffic of AV communications.

Therefore, when the network is crowded with the traffic of other transmissions, sound/music may break into pieces or quality of moving-picture may be deteriorated.

In order to communicate multi-media data, such as AV data, without quality deterioration, it is necessary to reserve network resources using reservation on a network path to guarantee communication quality.

The IETF (Internet Engineering Task Force) has defined resource management protocol, such as RSVP (Resource Reservation Protocol), as a method of reserving network resources.

In RSVP, network resources required for multi-media communications are allocated on a communication path from one terminal to a communication partner thereof, before the multi-media communications begin.

When RSVP is used, since the network resources required for every stream can become reservable before the communications begin, communication quality can be guaranteed.

SBM (Subnet Bandwidth Manager) is protocol for admission control and bandwidth management on IEEE802.1LAN, which is based on RSVP. SBM realizes bandwidth reservation in link layers, using bandwidth management functions called DSBM (Designated Subnet Bandwidth Manager).

Hereinafter, operation using RSVP will now be explained. In RSVP, bandwidth reservation is performed by transmitting admission control messages among a network-relaying device that supports RSVP, a transmitting terminal and a receiving terminal. The transmitting terminals transmit a PATH message that describes traffic properties of transmitting data to the receiving terminal.

The PATH message reaches the receiving terminal via a path composed of the network-relaying device. The receiving terminal transmits to the transmitting terminal a RESV message that describes network resources required for receiving. The network devices on the path reserve their own network resources according to the contents of the RESV message, thereby, the bandwidth reservation of the communication between the transmitting terminal and the receiving terminal is realized. Transmitting a RESV message periodically can continue the reservation of the resources.

On the other hand, DiffServ (Differenciated Services) is defined in the IETF as a bandwidth reservation method based on reservation of network resources. DiffServ belongs to priority control type protocol. When DiffServ is used in a DS field of an IP header, the priority value of DSCP (DiffServCodePoint) is set corresponding to priority class classified according to significance of data.

The network-relaying device on the network can identify priority based on this DSCP value, and can transmit packets with a higher priority prior to packets with other classes of priority, while relating to the network resources reserved by RSVP.

IEEE802.1p is defined as a method for realizing priority control in a "layer 2" level. IEEE802.1 p may be used in a switch having priority control functions.

Next, an example of bandwidth reservation is explained. A terminal reserves network resources of network devices existing on a communication path using RSVP. The network-relaying device uses a value of DSCP of an IP header, or a value of IEEE802.1p of an IEEE802.1Q VLAN header, in order to identify the reservation.

For example, a router, which belongs to the network relaying device, is identified as follows: Packets for each of which DSCP value is "5" belong to a flow whose assigned bandwidth is 30 Mbps.

A switch, which also belongs to the network relaying device, is identified as follows: Packets for each of which IEEE802.1p value is "6" belong to a flow that should be processed in real time.

On the other hand, the transmitting terminal transmits packets after setting a DSCP value to an IP header of each of the packets and setting an IEEE802.1p priority to a MAC header of each of the packets. The network relaying device can perform priority control based on DSCP and/or the IEEE802.1p priority. Thus, a flow that priority should be set is separated from other flow not requiring priority be set, thereby guaranteeing bandwidth.

In the conventional techniques (RSVP and/or SBM), the reservation of resources is performed by transmitting packets for reservation when service begins and sending reservation messages periodically to maintain the reservation.

However, as described below, with the conventional techniques, when a terminal moves and the communication path is changed, communication quality cannot be guaranteed.

(When a Source Terminal Moves)

Figure 13:
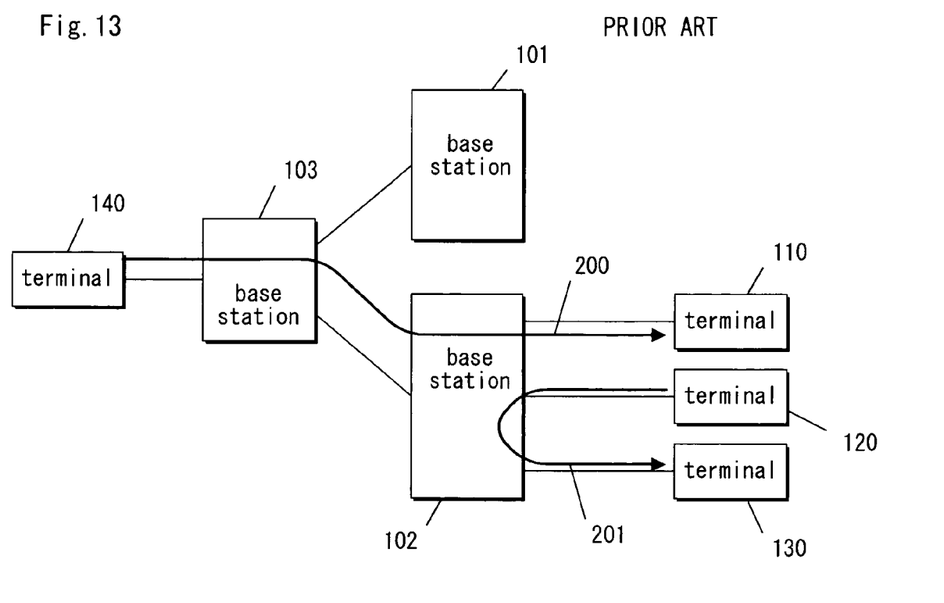
FIG. 13 to FIG. 16 are explanatory drawings of change of a communication path in the related art.

FIG. 13 is a block diagram of a conventional communication system. In this communication system, each of base stations 101, 102 and 103 plays a role of the relaying device. The base station 103 and the base station 101, and the base station 103 and the base station 102, respectively, are connected by a cable and/or wireless.

A terminal 140 connects to the base station 103, and terminals 110, 120, and 130 connect to the base station 102.

There is a communication path 200. In the communication path 200, the terminal 140 is a source terminal, and the communication path 200 continues, via the base stations 103 and 102, to the terminal 110 that is a destination terminal. The network resources of the communication path 200 are reserved.

There is a communication path 201. In the communication path 201, the terminal 120 is a source terminal, and the communication path 201 continues, via the base station 102, to the terminal 130 that is a destination terminal. The network resources of the communication path 201 are reserved.

Figure 14:
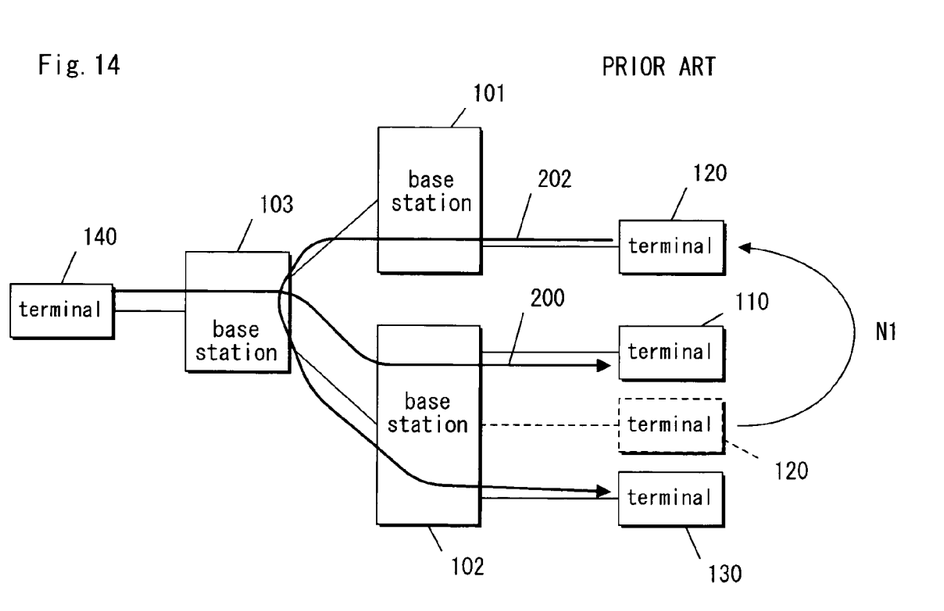

As shown using an arrow N1 of FIG. 14, since the terminal 120 has moved, a connection between the terminal 120 and the base station 102 is canceled, and the terminal 120 connects with the base station 101. Consequently, a new communication path 202 is formed. In the communication path 202, the terminal 120 is a source terminal, and the communication path 202 continues, via the base stations 101, 102 and 103, to the terminal 130 that is a destination terminal.

However, when the communication path 202 has just been formed, the network resources of the communication path 202 have not been reserved yet.

If the terminal 120 continues to transmit packets after moving, the terminal 120 transmits packets without reservation until the reservation of communication path 202 is established, while the base stations 101, 103, and 102 perform priority control of packets belonging to a flow that is not reserved.

Consequently, since the bandwidth of the traffic of communication path 200 to which priority should be set is essentially suppressed, the communication quality of the traffic may deteriorate.

(When a Destination Terminal Moves)

Figure 15:
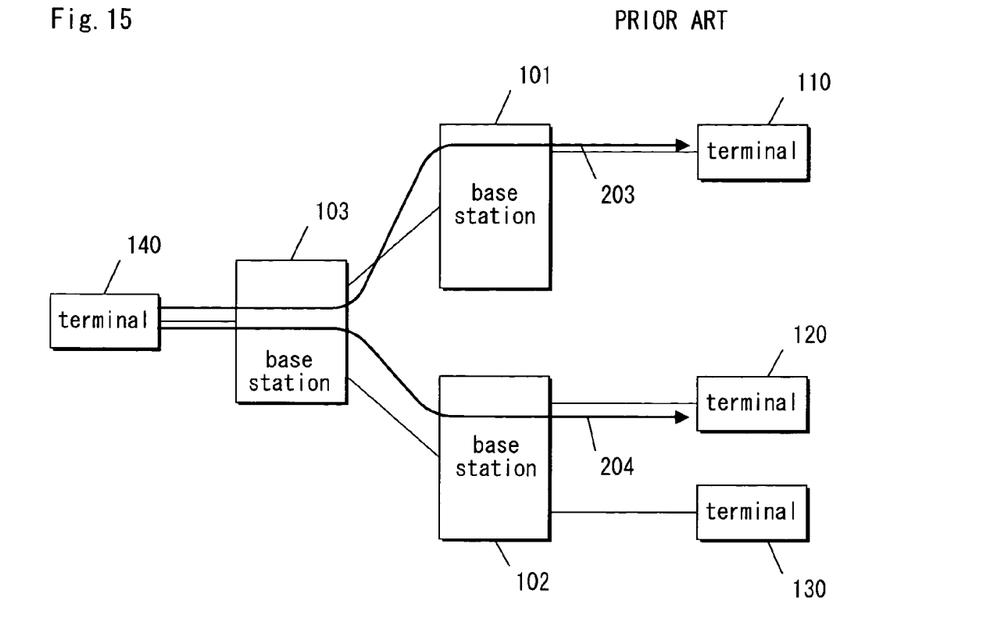

FIG. 15 is a block diagram of a conventional communication system. In the state of FIG. 15, the terminal 140 connects to the base station 103, the terminal 110 connects to the base station 101, and the terminals 120 and 130 connect to the base station 102.

There is a communication path 203. In the communication path 203, the terminal 140 is a source terminal, and the communication path 203 continues, via the base stations 103 and 101, to the terminal 110 that is a destination terminal. The network resources of the communication path 203 are reserved.

There is a communication path 204. In the communication path 204, the terminal 140 is a source terminal, and the communication path 204 continues, via the base stations 103 and 102, to the terminal 120 that is a destination terminal. The network resources of the communication path 204 are reserved.

Figure 16:
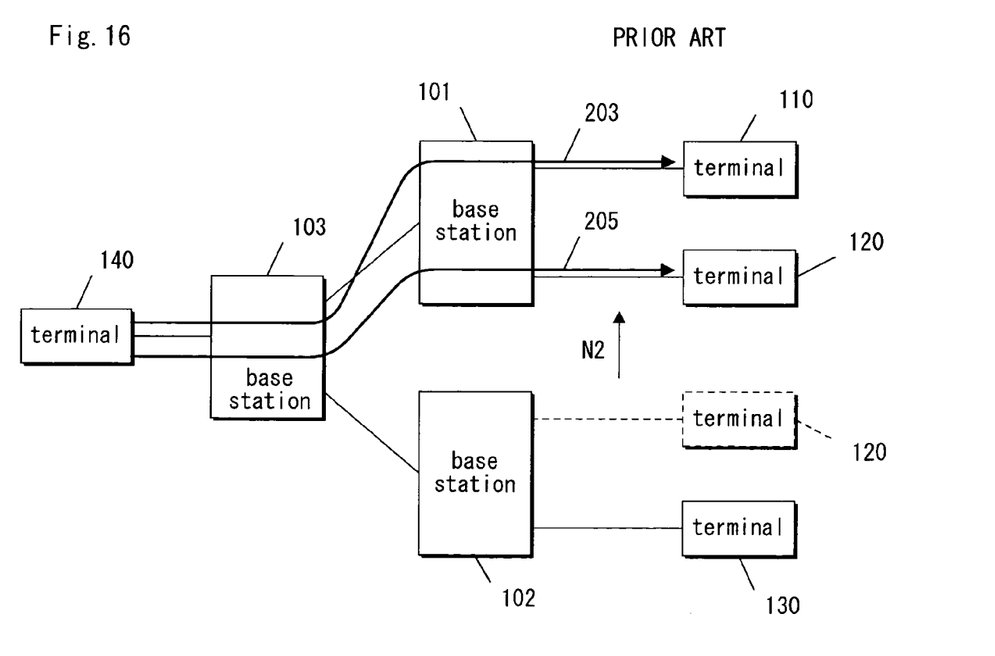

As shown using an arrow N2 of FIG. 16, since the terminal 120 has moved, a connection between the terminal 120 and the base station 102 is canceled and the terminal 120 connects with the base station 101. Consequently, a new communication path 205 is formed.

Like the above-mentioned case, if the terminal 140 continues to transmit packets after the terminal 120 moves, the bandwidth of the traffic of communication path 203 to which priority should be set is essentially suppressed, the communication quality of the traffic may deteriorate.

In recent years, since wireless LANs and mobile environment spread far and wide, it is obvious that communication paths frequently change according to moving of a terminal and solution thereof is required.

SUMMARY OF THE INVENTION

Therefore, an object of the present invention is to provide a communication system that, even when one terminal moves, reserving network resources can guarantee communication quality of the other terminals.

A first aspect of the present invention provides a communication system for supporting reservation of network resources including a plurality of terminals and a relaying device operable to perform priority control of packets based on priority set to each of the packets to relay among the plurality of terminals. Each of the plurality of terminals includes a communication-managing table operable to store communication information of both a terminal and a communication partner thereof. The terminal and the communication partner are included in the plurality of terminals. Each of the plurality of terminals also includes a packet-transmitting unit operable to set priority for each of the packets according to the communication information stored on the communication-managing table, a packet-receiving unit operable to receive the packets and a link-managing unit. The link-managing unit is operable to update the priority of each of the packets transmitted from the terminal, such that the priority of each of the packets is included in the communication information stored on the communication-managing table, when a link condition of the terminal changes.

With this structure, because the terminal that moves updates the priority of packets relating to the terminal, moving the terminal does not influence communications of the other terminals. Thus, quality of communications of the other terminals is not deteriorated.

A second aspect of the present invention provides a communication system substantially similar to that defined in the first aspect of the present invention. Moreover, the communication system according to the second aspect includes a priority-assigning unit operable to manage, and when requested assign, priority of packets of each of the plurality of terminals, wherein each of the plurality of terminals acquires, from the priority-assigning unit, priority that is set to packets whose source terminal is the terminal.

A third aspect of the present invention provides a communication system as defined in the second aspect of the present invention. Moreover, according to the third aspect of the invention, when the link condition of the terminal changes, the terminal acquires, from the priority-assigning unit, a new priority that is set to the packets whose source terminal is the terminal and updates the priority of the packets whose source terminal is the terminal to the new priority.

With these structures, even when the source terminal moves, the priority-assigning unit can set the new priority collectively and efficiently.

A fourth aspect of the present invention provides a communication system as defined in the first aspect of the present invention. Moreover, according to the fourth aspect of the invention, when the link condition of the own terminal changes, the own terminal notifies a source terminal of the terminal that the priority set to packets in communications between the source terminal and the terminal should be changed. When the source terminal acquires, from the priority-assigning unit, a new priority to be set to the packets in the communications between the source terminal and the terminal, the source terminal updates the priority set to the packets in the communications between the source terminal and the terminal, to the new priority acquired from the priority-assigning unit.

With this structure, even when the destination terminal moves the priority-assigning unit can set the new priority collectively and efficiently.

A fifth aspect of the present invention provides a communication system as defined in the first aspect of the present invention. Moreover, according to the fifth aspect of the invention the relaying device is a base station of a wireless LAN, such that the link-managing unit of each of the plurality of terminals judges that the link condition changes when connection between the terminal and the base station changes.

With this structure, when a terminal moves in a wireless LAN environment, the quality of communications of the other terminals can be guaranteed.

A sixth aspect of the present invention provides a communication system as defined in the first aspect of the present invention. Moreover, according to the sixth aspect of the invention, the relaying device is a switch of a cable LAN, such that the link-managing unit of each of the plurality of terminals judges that the link condition changes when connection between the terminal and the switch changes.

With this structure, when a terminal moves in a cable LAN environment, quality of communications of the other terminals can be guaranteed.

The above and other objects, features and advantages of the present invention will become apparent from the following description read in conjunction with the accompanying drawings, in which like reference numerals designate the same elements.

DETAILED DESCRIPTION OF THE INVENTION

Hereinafter, referring to the drawings, embodiments of the present invention will now be explained.

EMBODIMENT 1

Figure 1:
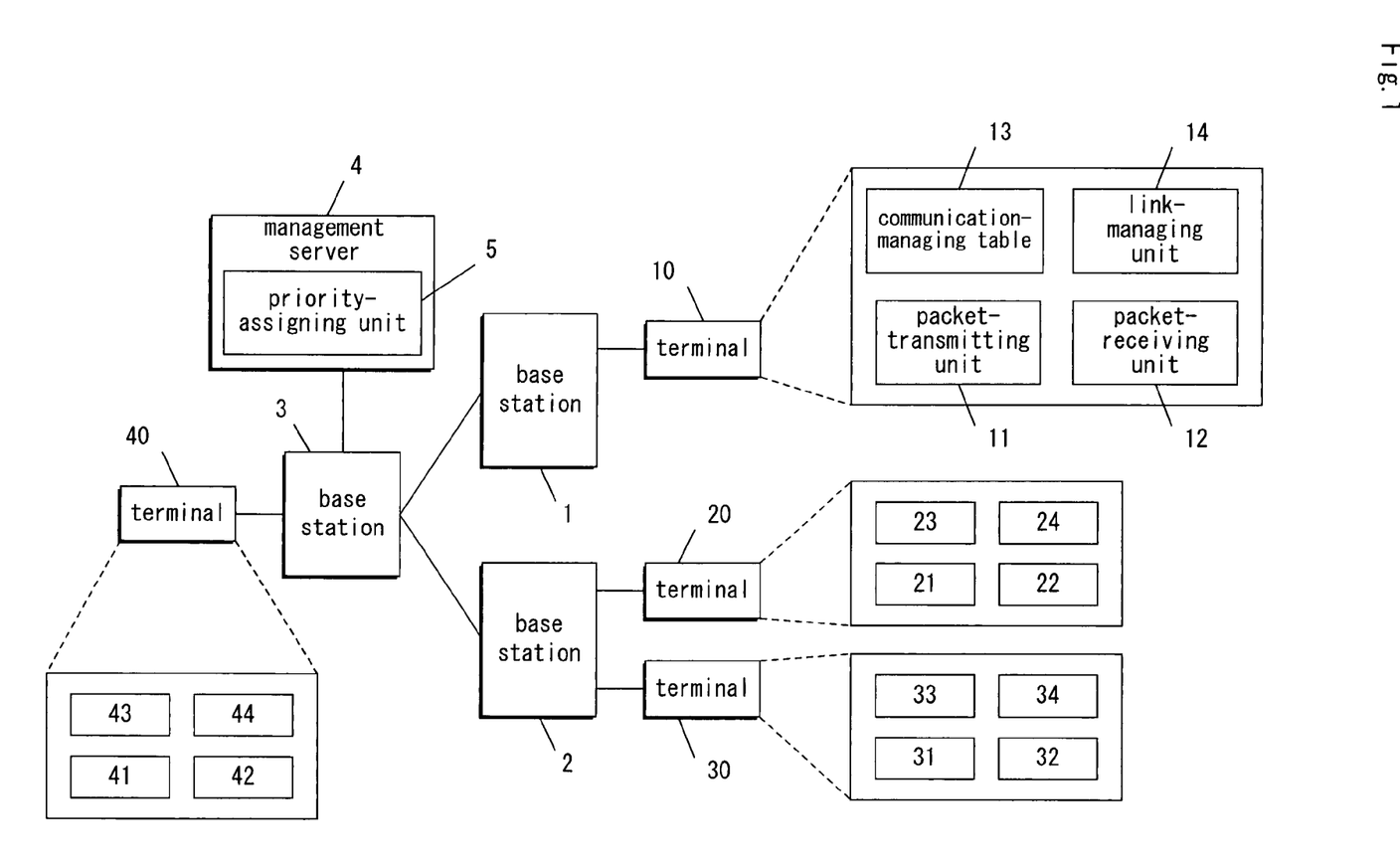
FIG. 1 is a block diagram of a communication system in a first embodiment of the present invention.

FIG. 1 is a block diagram of a communication system in a first embodiment of the present invention. The first embodiment relates to a case where a source terminal moves to change a link condition of the source terminal.

This communication system comprises base stations 1, 2, and 3 as relaying devices. The base station 3 and the base station 1, and the base station 3 and the base station 2, respectively, are connected by a cable and/or wireless.

In the first embodiment, it is assumed that these base stations 1, 2 and 3 are connected with terminals 10, 20, 30, and 40 by wireless to comprise a wireless LAN.

Of course, the present invention can be also applied to a case where a cable LAN is constituted similarly.

In the cable LAN, each of these relaying devices may be a "layer 2" switch.

The terminal 10 connects to the base station 1, the terminals 20 and 30 connect to the base station 2, and the terminal 40 connects to the base station 3.

The terminals 10, 20, 30, and 40 include communication-managing tables 13, 23, 33, and 43, respectively, link-managing units 14, 24, 34, and 44, respectively, packet-transmitting units 11, 21, 31, and 41, respectively, and packet-receiving units 12, 22, 32, and 42, respectively.

Each of the communication-managing tables 13, 23, 33, and 43 stores communication information between a terminal and a communication partner thereof. Every terminal has a communication partner thereof. One of the terminal and the communication partner is a source terminal and the other is a destination terminal.

Each of the packet-transmitting units 11, 21, 31, and 41 sets one or more classes of priority to each of the packets, based on communication information stored in each of the communication-managing tables 13, 23, 33, and 43. Moreover, the units 11, 21, 31, and 41 transmit the packets to a destination terminal thereof via one or more base stations.

Each of the packet-receiving units 12, 22, 32, and 42 receives packets via one or more base stations from a source terminal thereof.

Each of the link-managing units 14, 24, 34, and 44 searches communications of the terminals 10, 20, 30, and 40 when they are operating as source terminals, in each of the communication-managing tables 13, 23, 33, and 43, respectively. When the communications exist, each of the link-managing units 14, 24, 34, and 44 updates, regarding the communications, the priority of the packets, which is included in the communication information stored in each of the communication-managing tables 13, 23, 33, and 43, respectively.

A management server 4 can be arranged in arbitrary locations to which the base stations 1, 2 and 3 can communicate. The management server 4 connects to the base station 3 and manages a reservation status of network resources in this communication system.

A priority-assigning unit 5 is provided in the management server 4. The priority-assigning unit 5 manages the priority of the terminals 10, 20, 30, and 40 and assigns the priority upon receiving a request from each of the terminals 10, 20, 30, and 40. Each of the terminals 10, 20, 30, and 40 acquires, from the priority-assigning unit 5, a priority that should be set to packets being transmitted from the terminal.

Figure 6A:
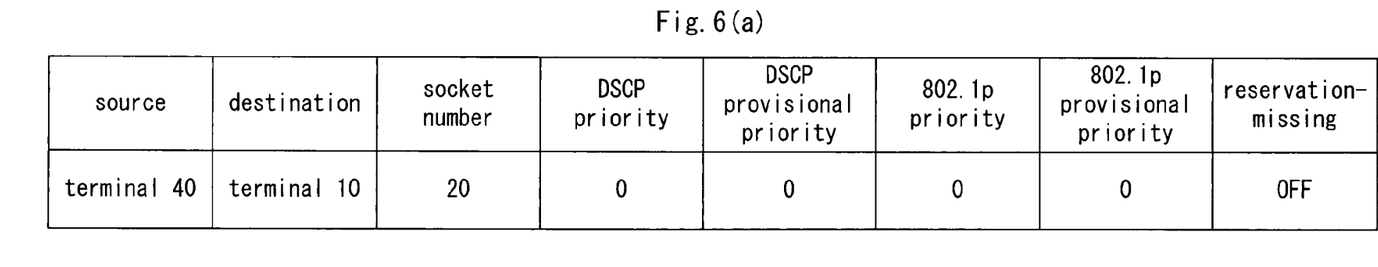
FIG. 6(a) to FIG. 6(e) are state diagrams of a communication-managing table in the first embodiment of the present invention.

To be more specific, when the priority-assigning unit 5 receives a source address, a destination address, and a reservation bandwidth from each of the terminals 10, 20, 30 and 40, the priority-assigning unit 5 assigns priority including a value of a DSCP priority and an IEEE802.1p priority to the same terminals. The assigned priority relates to communications in a communication path between the source address and the destination address. Each of the communication-managing tables 13, 23, 33, and 43 comprises one or more entries (See FIG. 6 (a)) for every communication path.

In the first embodiment, each entry has a plurality of fields each of which records the following values, that is, a source address, a destination address, a socket number, a DSCP priority, a DSCP provisional priority, an 802.1p priority, an 802.1 provisional priority, and a "reservation-missing" flag.

In the first embodiment, but for specific explanation, the priority set to a packet includes a set of the DSCP priority and the 802.1p priority. It is assumed that, as shown in FIG. 6 (a), when an entry is established, the following operation is performed for one communication path.

Each of the link-managing units 14, 24, 34, and 44 sets a corresponding value of the communication path to each of a plurality of fields, that is, the address of source, the address of destination, and the socket number. And, each of the link-managing units 14, 24, 34, and 44 sets an initial value of "0" to a plurality of priority fields, that is, the DSCP priority, the DSCP provisional priority, the 802.1p priority, and the 802.1 provisional priority. Further, each of the link-managing units 14, 24, 34, and 44 sets an initial value of "OFF" to the "reservation-missing" flag. Of course, the values assigned by the priority-assigning unit 5 may be used as the initial values.

When the "reservation-missing" flag is "OFF", it means that this communication path is reserved, whereas, when the "reservation-missing" flag is "ON", it means that this communication path is not reserved.

Figure 2:
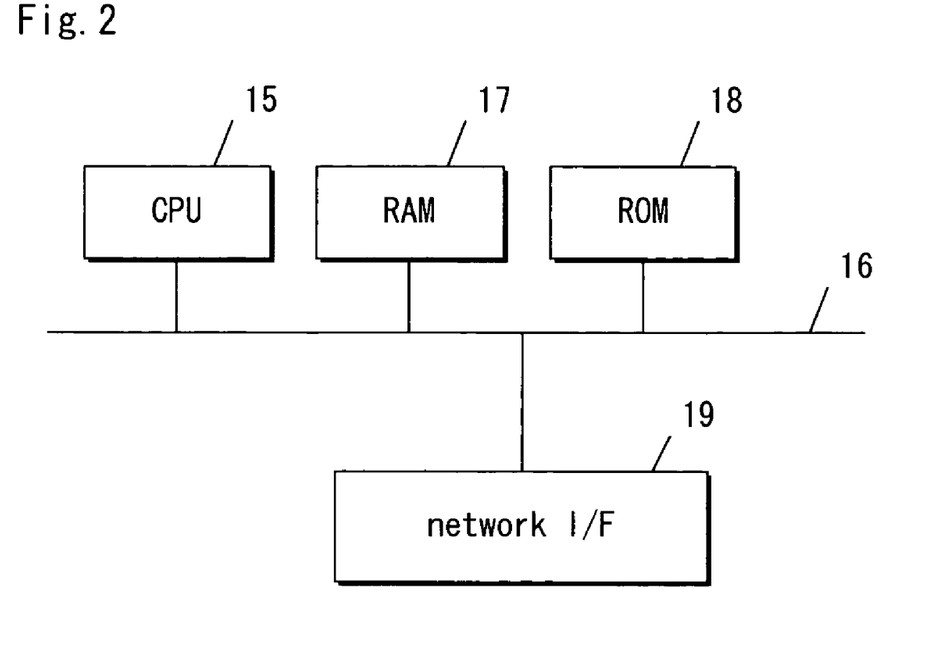
FIG. 2 is a hardware configuration figure of a terminal in the first embodiment of the present invention.

FIG. 2 is a hardware configuration figure of the terminal 10 in the first embodiment of the present invention. Here, since the terminals 20, 30, and 40 have the same configurations as the terminal 10, only the terminal 10 is explained below in order to avoid duplication of explanations.

As shown in FIG. 2, a CPU 15 executes a system program expressed by a plurality of flow charts (FIG. 3 to FIG. 5, FIG. 8, and FIG. 9), and controls each of the elements in FIG. 1. This system program is stored in a ROM 18, which is connected to the CPU 15 via a bus 16. When the CPU 15 executes this system program, the link-managing unit 14 of FIG. 1 is realized.

A RAM 17 has a storing region that the CPU 15 needs for processing thereof and a storing region for the communication-managing table 13.

When a network interface 19 outputs and inputs via the network under control of the CPU 15, the packet-transmitting unit 11 and the packet-receiving unit 12 are realized.

Next, referring to FIG. 1 and FIGS. 6(*a*) AND 6(*b*), procedures of acquiring priority that the terminal 40 should set to packets thereof is explained. Herein, the terminal 40 is a source terminal and the terminal 10 is a destination terminal.

The terminals 10 and 40 establish socket communications and obtain a socket number mutually. As shown in FIG. 6 (*a*), the link-managing unit 14 of the terminal 10 and the link-managing unit 44 of the terminal 40 store the following values in the communication-managing tables 13 and 43, respectively. These values include the source address, the destination address, the socket number, the DSCP priority, the DSCP low priority, the 802.1p priority, the 802.1p low priority, and the "reservation-missing" flag.

The terminal 10 transmits information to the management server 4. This information relates to the source address (an IP address of the terminal 40), the destination address (an IP address of the terminal 10), and a requested bandwidth.

The management server 4 judges whether the requested bandwidth is available in the communication path between the terminal 10 and the terminal 40.

When available, the management server 4 assigns priority (the DSCP priority and the IEEE802.1p priority) that can be used in the communication path, and transmits the assigned priority to the terminal 10. In this example, the DSCP priority is set to a value of "32" and the IEEE802.1p priority is set to a value of "6."

Figure 6B:
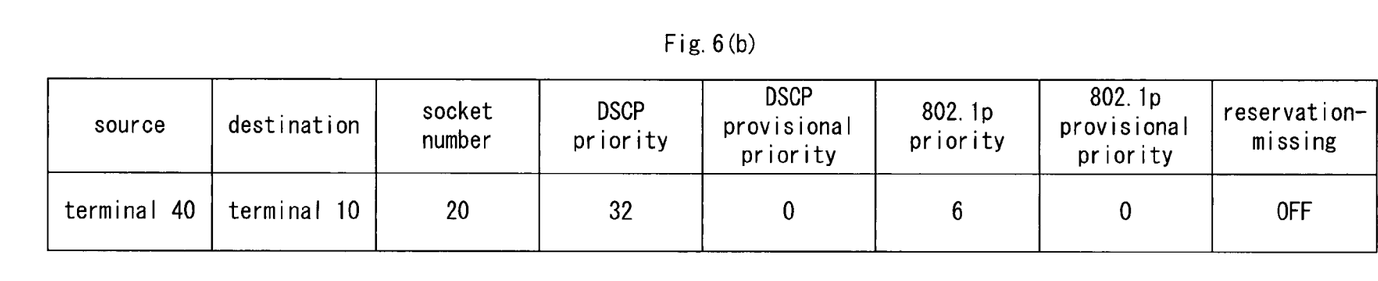
Figure 6C:
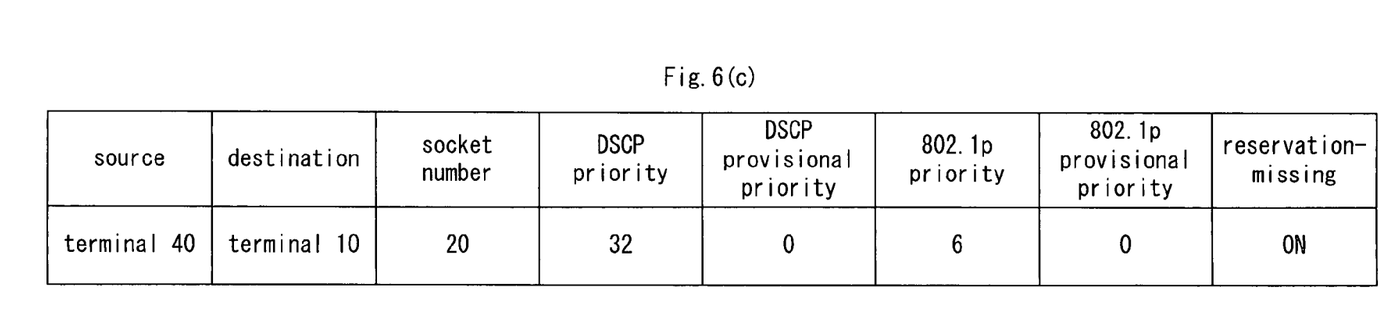
Figure 6D:
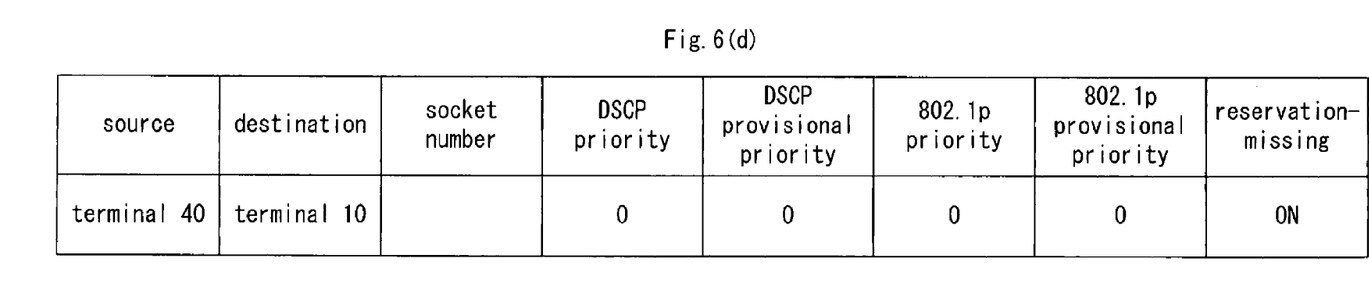
Figure 6E:
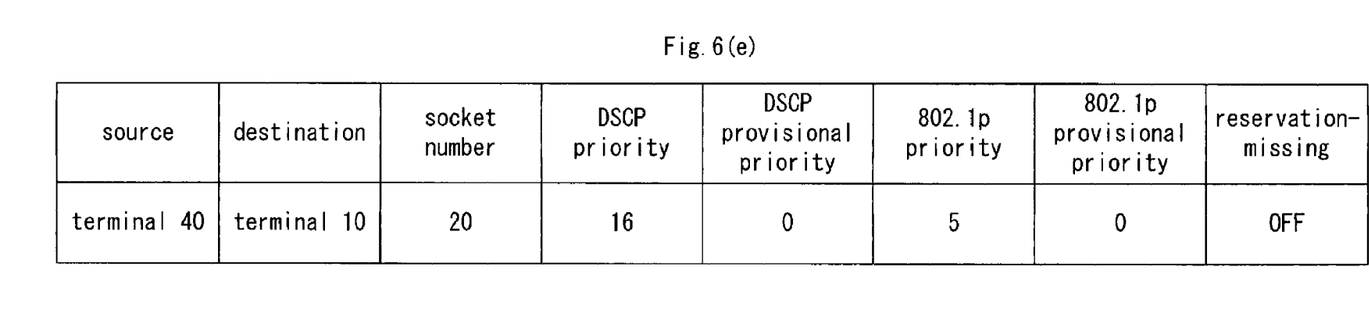

The terminal 10 receives this priority from the management server 4. As shown in FIG. 6 (*b*), the link-managing unit 14 of the terminal 10 stores this priority in the communication-managing table 14.

The terminal 10 transmits the priority to the terminal 40, and the terminal 40 receives packets using the priority.

The link-managing unit 44 of the terminal 40 stores the acquired priority value in the communication-managing table 43.

The terminal 40 sets the priority to packets thereof and starts communications.

In the above-mentioned processes, the terminal 10 that is the destination terminal, after querying the management server 4, transmits the priority to the terminal 40. Otherwise, the terminal 40 that is the source terminal, may, after querying to the management server 4, transmit the priority to the terminal 10.

Thereby, terminal 20 and terminal 30 can communicate using packets each having the priority assigned by the management server 4.

Figure 7:
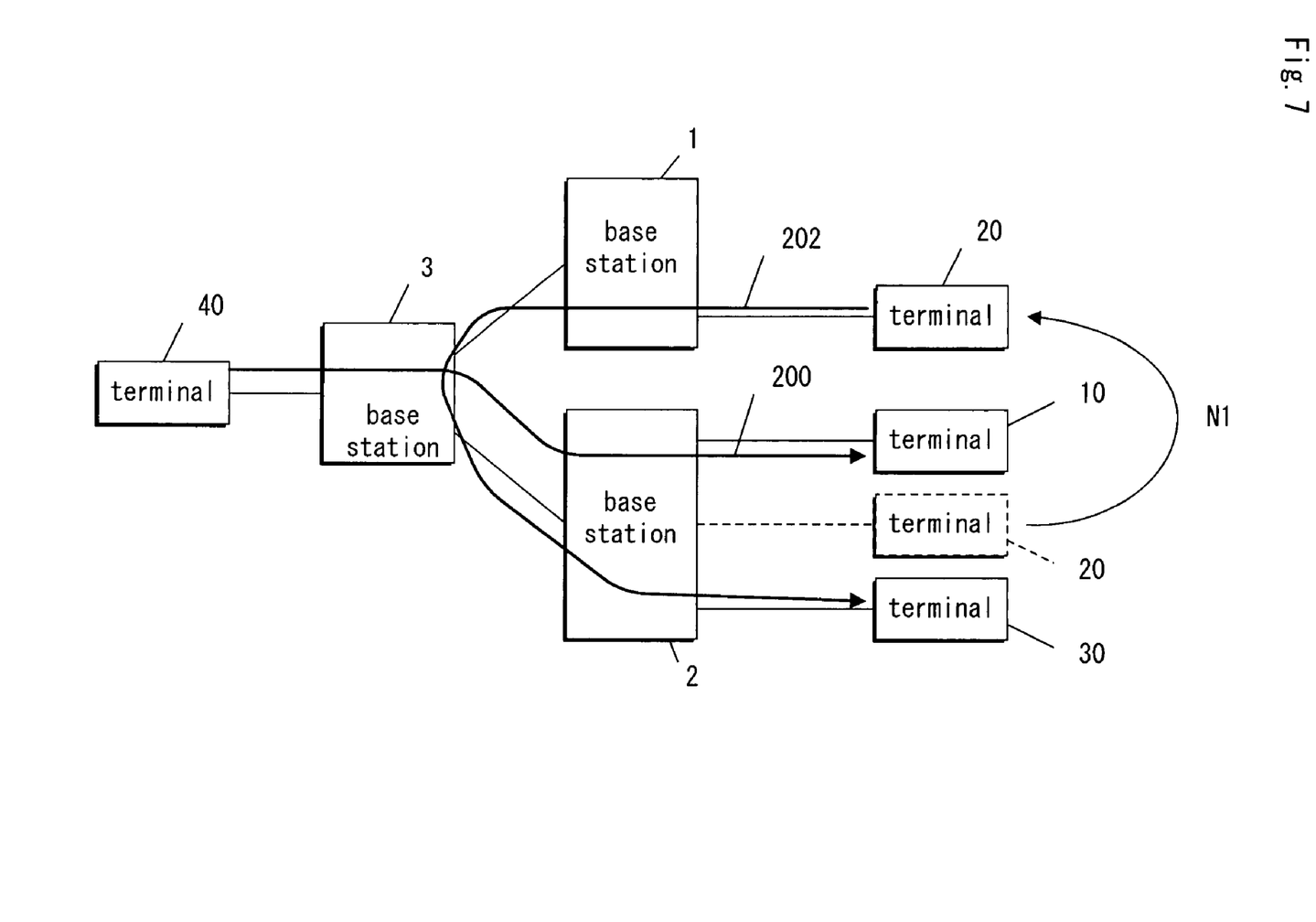
FIG. 7 is an explanatory drawing of change of a communication path in the first embodiment of the present invention.

Next, an operating example is explained. In the example, the terminal 20 moves, as shown using an arrow N1 of FIG. 7, so that terminal 20 changes connection from the base station 2 to the base station 1. The operation includes: (1) operation at the time of link-down, or disconnecting; (2) operation at the time of link-up, or connecting; and (3) operation at the time of re-processing of priority.

(1) Operation at the Time of Link-Down

Figure 3:
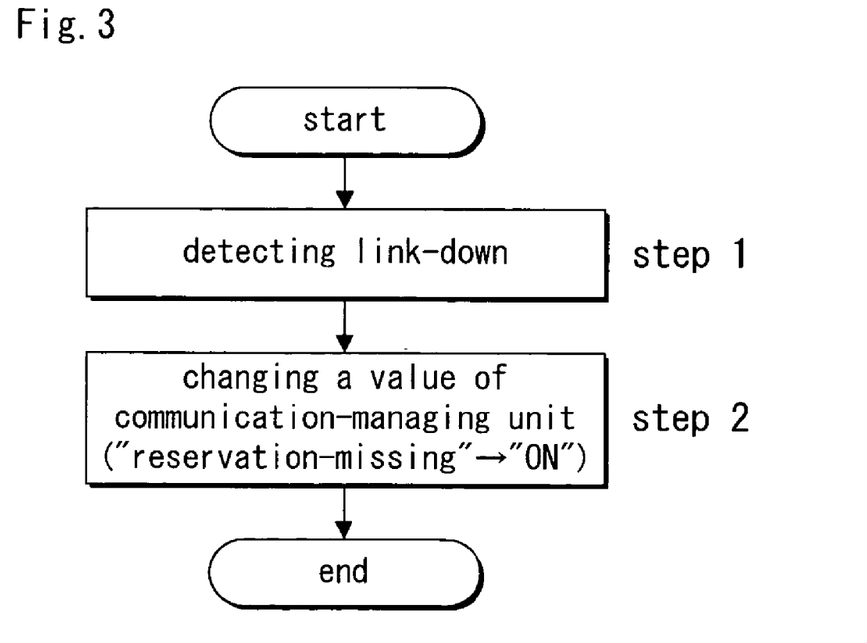
FIG. 3 to FIG. 5 are flow charts of a link-managing unit in the first embodiment of the present invention.

First, referring to FIG. 3 and FIG. 6(*c*), operation when the terminal 20 cancels connection with the base station 2 is explained.

When the connection between the terminal 20 and the base station 2 is canceled, at step 1 of FIG. 3, the link-managing unit 24 detects link-down.

When link-down is detected, at step 2 of FIG. 3, the link-managing unit 24 sets the "reservation-missing" flag of the communication-managing table 23 to "ON" as shown in FIG. 6(*c*). By the above, the operation at the time of link-down is completed.

(2) Operation at the Time of Link-Up

Figure 4:
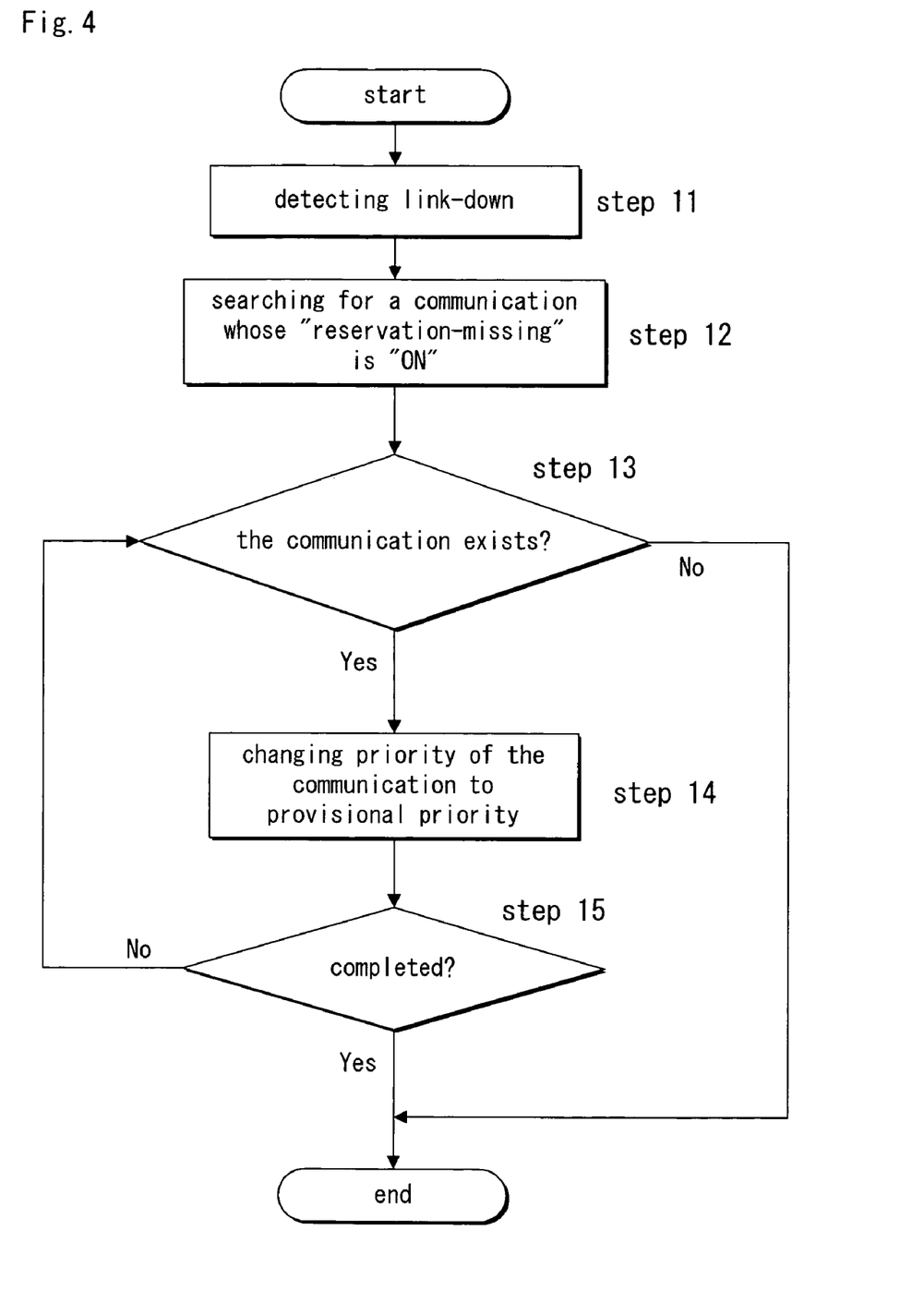

Next, referring to FIG. 4 and FIG. 6(*c*), operation when the terminal 20 connects to the base station 1 is explained.

When the terminal 20 connects to the base station 1, at step 11 of FIG. 4, the link-managing unit 24 detects link-up.

When the link-managing unit 24 detects link-up, the link-managing unit 24 performs the following processes with respect to each of communications stored on the communication-managing table 23. At step 12, the link-managing unit 24 searches a communication whose "reservation-missing" flag is "ON".

At step 13 to step 15, the link-managing unit 24 changes the present priority of all communications whose "reservation-missing" flags are "ON" such that the DSCP provisional priority and the 802.1 provisional priority (See FIG. 6(*c*)) are used. These items of provisional priority do not influence other communications.

Thereby, at the time of link-up, the priority stored on the communication-managing table 23 is changed. After the priority is changed, the packet-transmitting unit 21 continues to transmit packets being set with the new priority.

(3) Operation at the Time of Re-Processing of Priority

Figure 5:
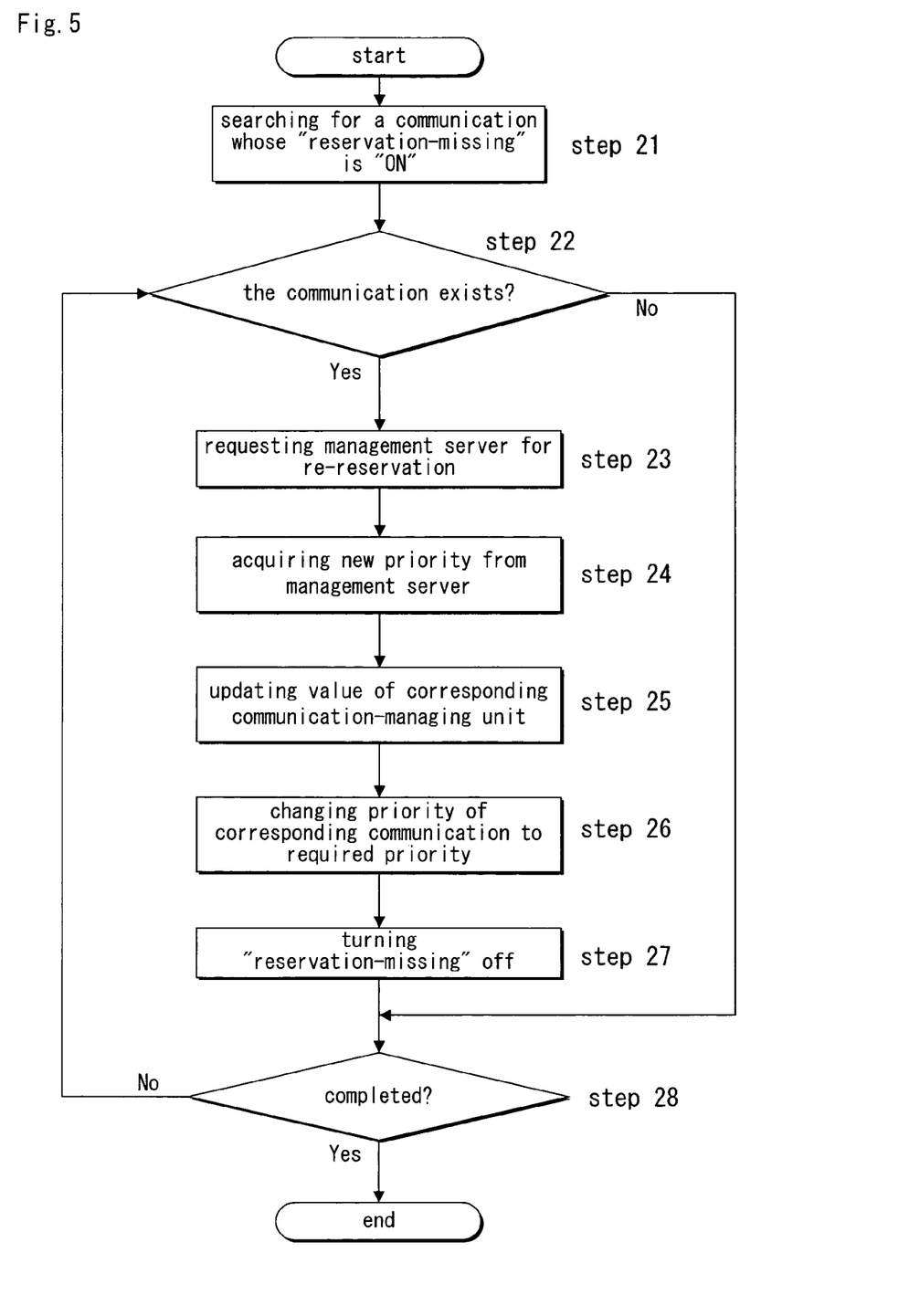

Next, referring to FIG. 5 and FIG. 6(*e*), operation of re-acquiring priority is explained.

First, at step 21 of FIG. 5, the link-managing unit 24 searches a communication whose "reservation-missing" flag is "ON" in the communication-managing table 23. At step 22, when the communication whose "reservation-missing" flag is "ON" exists, at step 23, the link-managing unit 24 requests the management server 4 for re-reservation, transmits the source, the destination, and the required bandwidth. At step 24, the link-managing unit 24 acquires new priority from the priority-assigning unit 5 of the management server 4. Herein, it is assumed that new priority (the DSCP priority: "16", and the 802.1p priority: "5") is assigned and acquired.

Then, at step 25, as shown in FIG. 6 (*e*), the link-managing unit 24 updates the priority value of the communication-managing table 23. At step 26, the link-managing unit 24 changes the priority of the packets of corresponding communication to the newly acquired priority. At step 27, the link-managing unit 24 sets the "reservation-missing" flag of this communication as "OFF". And, the link-managing unit 24 repeats processes of step 22 to step 27 with respect to all communications (step 28).

In the above processes, since communications using priority that does not influence other communications are performed, until new priority is assigned, quality of other communications is not deteriorated.

EMBODIMENT 2

A second embodiment relates to a case where a destination terminal moves to change a link condition of the destination terminal. Hereinafter, referring to FIGS. 8, 9, and 10, a difference from the first embodiment is explained.

Figure 10:
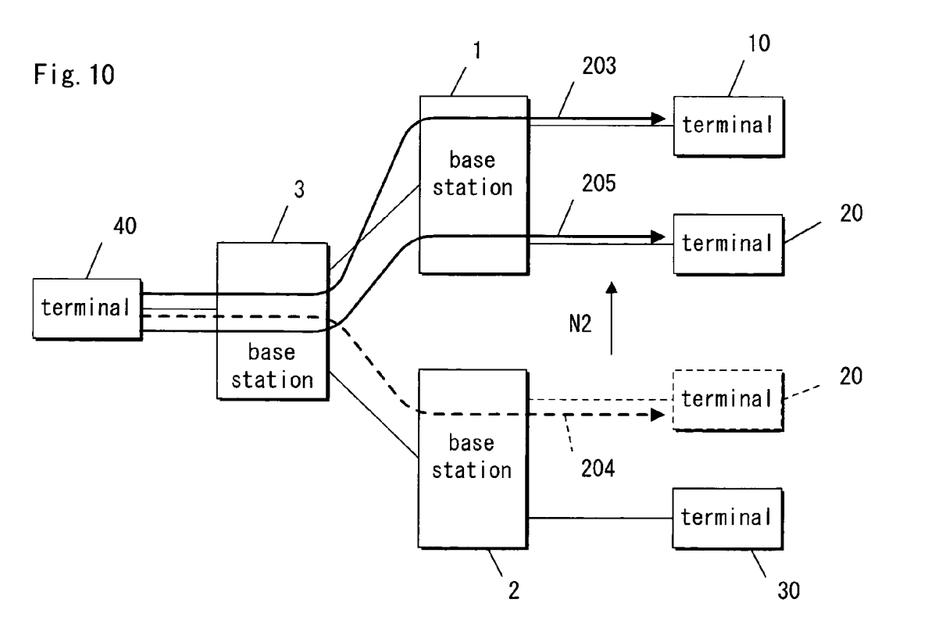
FIG. 10 is an explanatory drawing of change of a communication path in the second embodiment 2 of the present invention.

In FIG. 10, the terminal 40 is a source terminal, and the terminals 10 and 20 are destination terminals. Before the terminal 20 moves as shown using an arrow N2, communication paths 203 and 204 are formed. Reservation of network resources is established in these communication paths 203 and 204. The terminal 10 connects to the base station 1, the terminal 20 connects to the base station 2, and the terminal 40 connects to the base station 3.

Operation when the terminal 20 moves as shown using the arrow N2 will now be explained. The priority-assigning unit 5 assigns priority in the same manner as in the first embodiment. Also, link-down operation is the same in the second embodiment as in the first embodiment.

Figure 8:
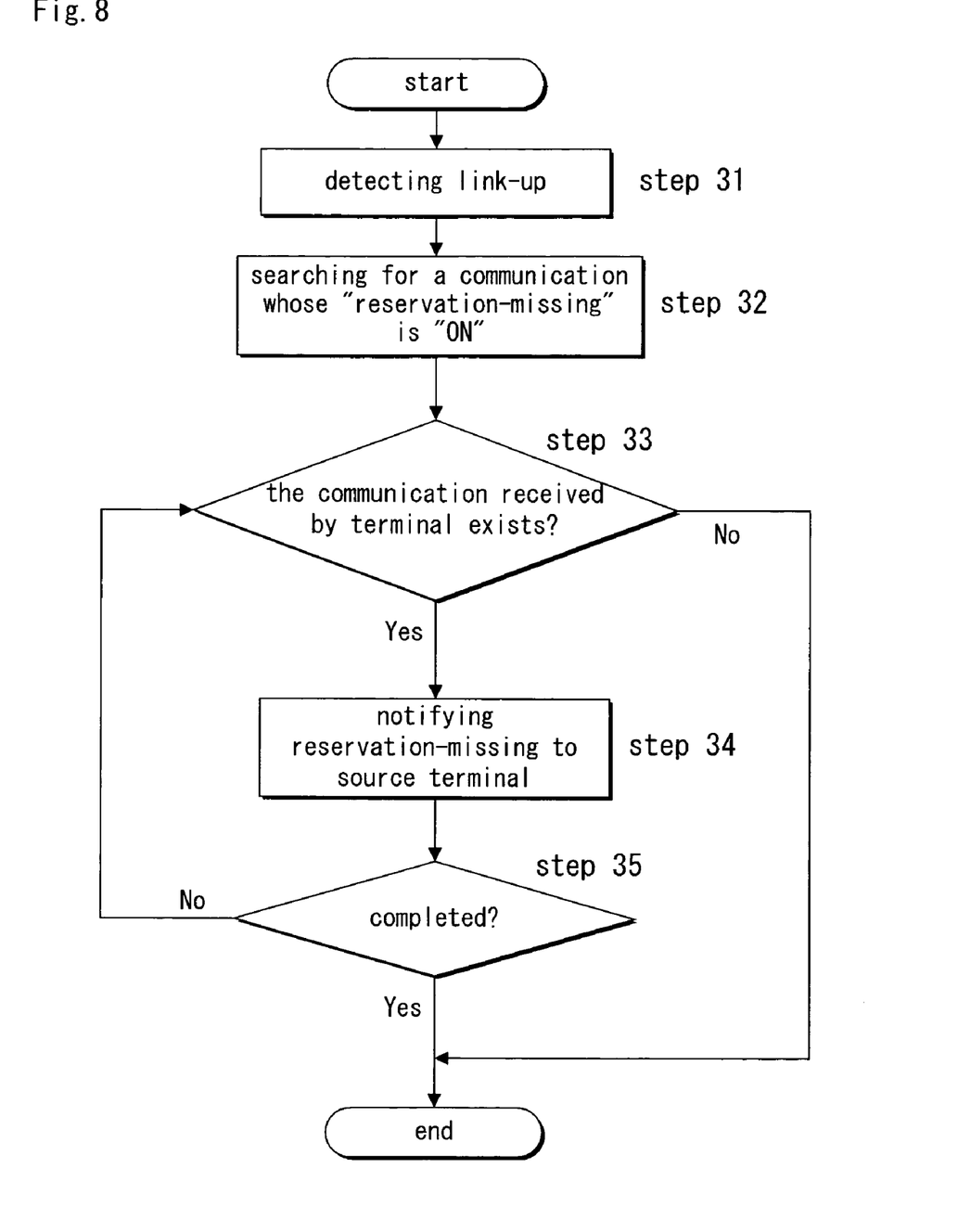
FIG. 8 to FIG. 9 are flow charts of a link-managing unit in a second embodiment of the present invention.

Now, at step 31 of FIG. 8, when the link-managing unit 24 of the terminal 20 detects link-up with the base station 1, the link-managing unit 24 processes as follows concerning communications whose destination terminal is the terminal (the terminal 20), information of the communications being stored on the communication-managing table 23.

First, at step 32, the link-managing unit 24 searches a communication whose "reservation-missing" flag is "ON" in the communication-managing table 23. When this communication exists (step 33), at step 34, the terminal 20 transmits "reservation-missing" to the terminal 40, which is a source terminal.

And the link-managing unit 24 repeats the above-mentioned processes concerning all communications for each of which "reservation-missing" flag is "ON" (step 35).

Thereby, at the time of link-up, the terminal 20 that moves and is the destination terminal, notifies the source terminal, which communicates with the terminal (here the terminal 20), that communications between the terminal and the source terminal thereof have become "reservation-missing", and information of the communications is stored on the communication-managing table 23.

Figure 9:
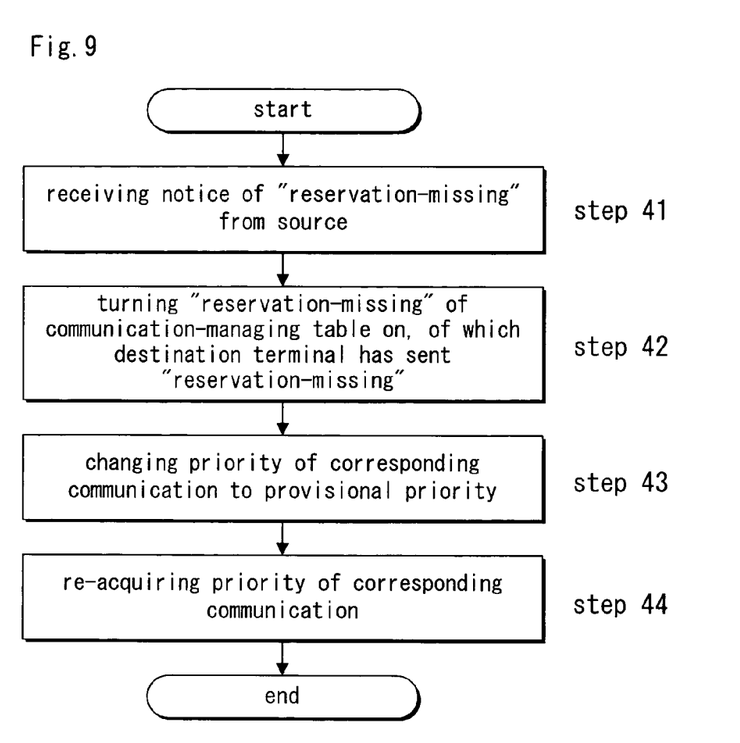

At step 41 of FIG. 9, when "reservation-missing" is transmitted to the terminal 40, which is a source terminal, by the terminal 20, which is a destination terminal, the terminal 40 performs the following processes.

At step 42, the link-managing unit 44 of the terminal 40 sets the "reservation-missing" flag of communications with the destination terminal (here the terminal 20) as "ON".

At step 43, the link-managing unit 44 changes the present priority of the communications such that the provisional priority is used. Thereby, the packet-transmitting unit 41, setting the new priority to packets thereof, continues the communications. The provisional priority does not influence other communications.

At step 44, the terminal 40 re-requests priority to the priority-assigning unit 5, and the acquired priority from the priority-assigning unit 5 is set up in the terminal 40. Since the re-requesting processes are the same as the first embodiment, explanation thereof is omitted.

In the above processes, when the destination terminal moves, a notification regarding the move is transmitted to the source terminal. Thereby, the source terminal sets the priority that does not influence other communications until a new priority is assigned to the source terminal, such that the quality of other communications is not deteriorated.

In both the first and second embodiments, connection using a wireless LAN is explained. However, the present invention can be applied to connections using a cable LAN, for example, an Ethernet (registered trademark). Herein, in the wireless LAN, "link-down" means that the base station is changed. In the cable LAN, "link-down" means that the cable is removed from a port of the switch. Of course, it is possible and further desirable to combine the first and second embodiments.

Figure 11:
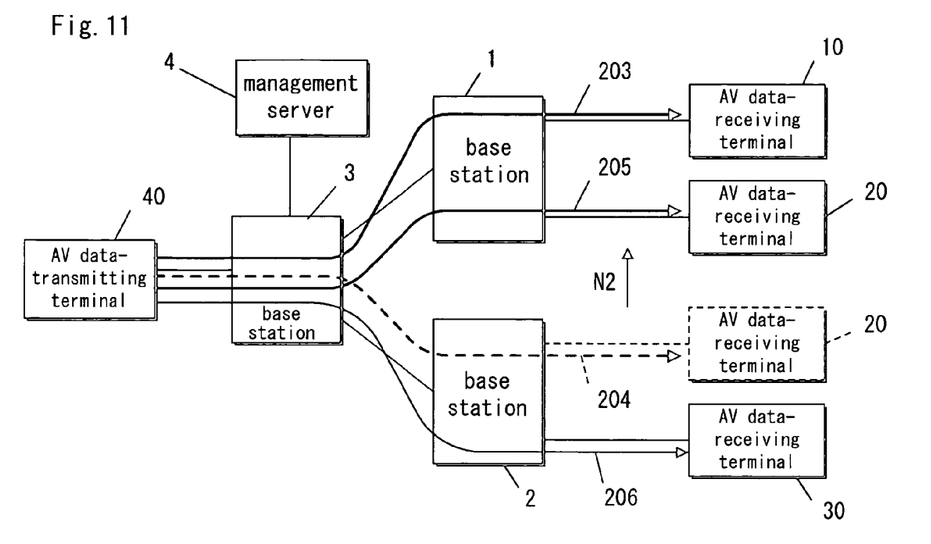
FIG. 11 to FIG. 12 are example explanatory drawings of change of a communication path in the second embodiment of the present invention.
Figure 12:
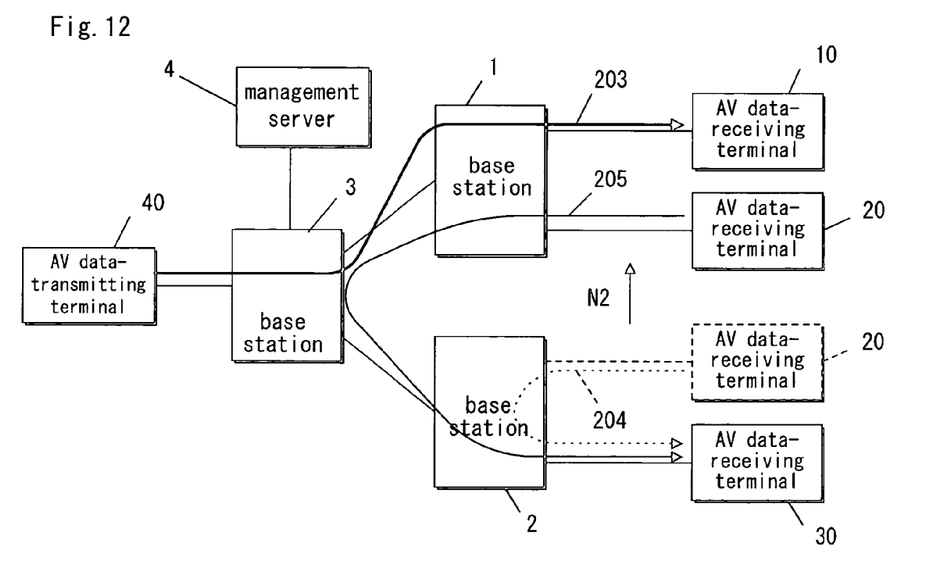

Next, referring to FIG. 11 and FIG. 12, a more specific example is explained. This example relates to a technique that applies the present invention to a public wireless LAN.

In FIG. 11, an AV data-transmitting terminal (an AV data server) 40 transmits AV data, and AV data-receiving terminals 10, 20, and 30 play AV data received from the AV data server 40. Here, it is assumed that the AV data-receiving terminal 20 moves from the base station 2 to the base station 1, and further that the base station 1 and the base station 2 constitute a public wireless LAN.

At this time, operation proceeds as follows:
(Condition 1): The AV data-receiving terminal 20 notifies to AV data server 40 that the AV data-receiving terminal 20 moves.
(Condition 2): The AV data server 40 continues communications with the AV data-receiving terminal 20, while lowering the priority of the communications.
(Condition 3): The AV data server 40 acquires a new priority from the management server 4.
(Condition 4): The AV data server 40 continues the communications with the AV data-receiving terminal 20 using the new priority acquired from the management server 4.

Here, fulfilling from the condition 1 to the condition 4, since communication quality of other terminals, that is, the AV data-receiving terminals 10 and 30, is guaranteed, the AV data-receiving terminals 10 and 30 can continue to play AV data maintaining quality thereof.

In FIG. 12, the AV data-transmitting terminals (AV data servers) 10 and 20 transmit AV data, the AV data-receiving terminal 30 receives AV data from the AV data server 20, and the AV data-receiving terminal 40 receives AV data from the AV data server 10. Here, it is assumed that the AV data server 20 moves from the base station 2 to the base station 1, and further that the base station 1 and the base station 2 constitute a public wireless LAN.

At this time, operation proceeds as follows:
(Condition 5): The AV data server 20, because of moving, continues communications with the AV data-receiving terminal 30, while lowering the priority of the communications.
(Condition 6): The AV data server 20 acquires a new priority from the management server 4.
(Condition 7): The AV data server 20 continues the communications with the AV data-receiving terminal 30 using the new priority acquired from the management server 4.

Here, from the condition 5 to the condition 7, since communication quality of other terminals, that is, the AV data server 10 and AV data-receiving terminal 40, is guaranteed, the AV data-receiving terminal 40 can continue to play AV data maintaining the quality thereof.

According to the present invention, even when a terminal moves, the terminal updates the priority of the communications relating to the terminal itself. Therefore, when the priority of the terminal is set up lower than the communications of the other terminals, quality of the communications of the other terminals is not deteriorated.

When a user of the terminal that moves is a high-priced user or an executive, it is desirable to set the priority of communications of the user higher than other communications at any time, whether the terminal of the user moves or not, thereby, the quality of the communications of the user is guaranteed to be fine by always preventing quality deterioration.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A communication system for supporting reservation of network resources, said system comprising:
    a plurality of terminals; and
    a relaying device operable to perform priority control of packets based on a priority set to each of the packets to relay the packets between said plurality of terminals,
    wherein each of said plurality of terminals comprises:
    a communication-managing table operable to store communication information of the terminal and a communication partner thereof, the communication partner is included in said plurality of terminals;
    a packet-transmitting unit operable to set the priority for each of the packets according to the communication information stored on said communication-managing table and operable to transmit the packets;
    a packet-receiving unit operable to receive packets; and
    a link-managing unit operable to update the priority of each of the packets transmitted from the terminal when a link condition of the terminal changes, the priority of each of the packets is included in the communication information stored in said communication-managing table, wherein each of said terminals is configured to couple to at least another of the terminals through said relaying device, such that when one of said terminals is moved, the link condition changes and said link managing unit is operable to update the priority of the packets, transmitted from the one terminal, from a previous priority value associated with the one terminal before the link condition changed to a new priority value.

2. The communication system as recited in claim 1, the communication system further comprising,
    a priority-assigning unit operable to manage, and when requested assign, the priority of packets of each of said terminals,
    wherein each of said terminals acquires from said priority-assigning unit, priority that is set to packets transmitted from the one terminal.

3. The communication system as recited in claim 2, wherein the one terminal acquires a new priority from said priority assigning unit that is set to the packets transmitted from the one terminal and updates priority of the packets transmitted from the one terminal to the new priority when the link condition of the one terminal changes.

4. The communication system as recited in claim 1, wherein, when the link condition of the one terminal changes, the one terminal notifies a corresponding source terminal that a priority set to packets for communications between the corresponding source terminal and the one terminal should be changed, and
    wherein the corresponding source terminal acquires, from a priority-assigning unit, a new priority to be set to the packets in the communications between the corresponding source terminal and the one terminal, and updates the priority set to the packets in the communications between the corresponding source terminal and the one terminal to the new priority.

5. The communication system as recited in claim 1, wherein said relaying device is a base station of a wireless LAN, and
    wherein said link-managing unit of each of said terminals judges that the link condition changes when a connection between the one terminal and said base station changes.

6. The communication system as recited in claim 1, wherein said relaying device is a switch of a cable LAN, and
    wherein said link-managing unit of each of said terminals judges that the link condition changes when a connection between the one terminal and said switch changes.

7. A terminal comprising:
    a communication-managing table operable to store communication information of the terminal and a communication partner thereof;
    a packet-transmitting unit operable to set a priority for each of a plurality of packets according to the communication information stored in said communication-managing table and operable to transmit the packets;
    a packet-receiving unit operable to receive packets; and
    a link-managing unit operable to update the priority of each of the packets transmitted from the terminal when a link condition of the terminal changes, the priority of each of the packets is included in the communication information stored in said communication-managing table, wherein each of said terminals is configured to couple to at least another of the terminals through said relaying device, such that when one of said terminals is moved, the link condition changes and said link managing unit is operable to update the priority of the packets transmitted from the one terminal, from a previous priority value associated with the one terminal before the link condition changed to a new priority value.

8. A communication method for supporting reservation of network resources, the communication method comprising:
    storing, in each of a plurality of terminals, communication information of the terminal and a communication partner thereof;
    setting a packet priority according to the communication information;
    transmitting the packet that sets the priority;
    receiving the packet that sets the priority; and
    updating the priority of packets transmitted from the terminal when a link condition of the terminal changes, including the priority in the stored communication information, and updating a priority value of the terminal from a previous priority value associated with the terminal before the link connection changed to a new priority value, wherein each terminal is configured to couple to at least another of said terminals through a relaying device, such that when one of said terminals is moved the link condition changes.

* * * * *